United States Patent
Puertas et al.

(10) Patent No.: US 12,274,394 B2
(45) Date of Patent: Apr. 15, 2025

(54) HEAT CHANNELING SYSTEM FOR OUTDOOR COOKING STATION AND METHOD THEREOF

(71) Applicant: North Atlantic Imports, LLC, Logan, UT (US)

(72) Inventors: Steve L. Puertas, Wellsville, UT (US); Christopher L. Hanks, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 387 days.

(21) Appl. No.: 16/926,681

(22) Filed: Jul. 11, 2020

(65) Prior Publication Data

US 2021/0007550 A1    Jan. 14, 2021

Related U.S. Application Data

(60) Provisional application No. 62/873,844, filed on Jul. 12, 2019.

(51) Int. Cl.
*A47J 37/06*    (2006.01)

(52) U.S. Cl.
CPC ....... *A47J 37/0682* (2013.01); *A47J 37/0676* (2013.01)

(58) Field of Classification Search
None
See application file for complete search history.

(56) References Cited

U.S. PATENT DOCUMENTS

| | | | |
|---|---|---|---|
| 1,201,138 | A | 10/1916 | Bingham |
| 1,447,813 | A | 3/1923 | Patrick |
| 2,304,140 | A | 1/1940 | Bergholm |
| 4,291,668 | A | 9/1981 | Moeller |
| 5,349,899 | A | 9/1994 | Tominaga et al. |
| 5,676,043 | A | 10/1997 | Best |
| 5,678,531 | A | 10/1997 | Byers et al. |
| 6,389,960 | B1 | 5/2002 | Williams et al. |
| 6,644,175 | B2 | 11/2003 | Stephen et al. |
| 7,348,519 | B2 | 3/2008 | Federspiel et al. |
| D604,098 | S | 11/2009 | Hamlin |

(Continued)

FOREIGN PATENT DOCUMENTS

| | | | | |
|---|---|---|---|---|
| CA | 2877372 C | * | 1/2019 | .............. F16B 12/34 |
| CN | 208925970 U | * | 6/2019 | ................ C09K 5/08 |
| CN | 208925970 U1 | * | 6/2019 | ................ C09K 5/08 |

OTHER PUBLICATIONS

Machine translation of CN 208925970 U performed on Aug. 10, 2022, Lee (Year: 2019).*

(Continued)

*Primary Examiner* — Dana Ross
*Assistant Examiner* — Kevin Guanhua Wen
(74) *Attorney, Agent, or Firm* — David L. Stott

(57) ABSTRACT

Devices, systems, and methods for channeling heat in an outdoor cooking station. The cooking station includes a moveable hood, movable between open and closed positions relative to the cooking station, and one or more heating elements for generating heat to a cooking surface, such as a griddle and/or grill. Further, the cooking station includes one or more baffles sized and configured to channel heat, generated by the one or more heating elements, from below the cooking surface to above the cooking surface.

17 Claims, 8 Drawing Sheets

(56) References Cited

U.S. PATENT DOCUMENTS

| | | | |
|---|---|---|---|
| D694,056 S | 11/2013 | Dahle | |
| 9,119,500 B2 | 9/2015 | Hamlin | |
| 9,125,517 B2* | 9/2015 | Fossati | A47J 37/07 99/324 |
| 9,788,688 B1* | 10/2017 | Ficarra | A47J 37/07 99/445 |
| 10,660,473 B2 | 5/2020 | Dahle et al. | |
| 2008/0105136 A1 | 5/2008 | McFadden | |
| 2008/0223359 A1 | 9/2008 | Huang | |
| 2010/0083949 A1 | 4/2010 | Lisheng | |
| 2010/0199857 A1 | 8/2010 | Storiz et al. | |
| 2014/0161952 A1 | 6/2014 | Sykes | |
| 2016/0255999 A1* | 9/2016 | McAdams et al. | A47J 37/07 |
| 2017/0332839 A1* | 11/2017 | Dahle et al. | A47J 37/06 |
| 2018/0338641 A1* | 11/2018 | Yaghotian et al. | A47J 37/07 |

OTHER PUBLICATIONS

Why you need to start griddle grilling. Meathead's Amazing Ribs. com. (2019, May 9). Retrieved Mar. 17, 2023, from https://amazingribs.com/bbq-technique-and-science/griddle-grilling/ (Year: 2019).*
Machine translation of CN 208925970 U1 performed on Apr. 1, 2024, Lee (Year: 2019).*

* cited by examiner

HEAT CHANNELING SYSTEM FOR OUTDOOR COOKING STATION AND METHOD THEREOF

CROSS-REFERENCE TO RELATED APPLICATIONS

This application claims the benefit of U.S. Provisional Application No. 62/873,844, filed Jul. 12, 2019, the disclosure of which is hereby incorporated by reference herein in its entirety.

TECHNICAL FIELD

The present invention relates generally to a heat channeling system and, more specifically, the present invention relates to channeling heat for an outdoor cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate structure composed of cast or wrought iron, aluminum or carbon steel. Griddles are commonly heated directly or indirectly by open flame or electrical elements. Using a griddle placed directly on a barbeque grill or over flame burners has also become popular due to the unique flavors and texture the griddle imparts to the food. Further, in some instances griddle cooking is better suited for certain foods than cooking over an open flame on a grill.

Managing food, cooking utensils and various spices and the like adjacent the cooking surface of the griddle often becomes problematic for the individual cooking. To overcome this problem, many of the griddle type cooking stations include some sort of side shelf attached to the cooking station. Such side shelves are typically positioned adjacent left and/or right sides of the griddle to provide easy access and appropriate management of the cooking area. However, due to the proximity of the side shelves to the cooking surface and the heat flowing out laterally from the underside of the griddle, potential dangerous conditions may arise that may not be immediately apparent to the individual cooking at the cooking station. Further, another challenge relating to the heat flowing laterally from the underside of a griddle type cooking station relates to incorporating a hood for such cooking station such that sidewalls of the hood may degrade quickly due to overheating such sidewalls of the hood.

BRIEF SUMMARY OF THE INVENTION

The present invention is directed to devices, systems, and methods for channeling heat in an outdoor cooking station. For example, in one embodiment, an outdoor cooking station includes a frame, a griddle, and one or more baffles. The frame extends to a front side, a rear side, a left side and a right side each extending between a lower end and an upper portion, the frame including one or more heating elements controlled along the front side and coupled to the frame. The griddle is configured to be supported by the frame and positioned above the heating elements, the griddle having a cooking surface and a splash guard extending upward from the cooking surface. The one or more baffles extend along at least the left and right sides, respectively, of the frame and adjacently along the splash guard of the griddle, the one or more baffles configured to funnel heat from under the griddle to above the splash guard of the griddle.

In another embodiment, the cooking station further includes a hood, the hood sized and configured to be positioned over the griddle and the one or more baffles. In still another embodiment, the cooking station includes a hood, the hood pivotably coupled to the rear side of the frame such that, upon the hood being in a closed position, the hood covers each of the griddle and the one or more baffles. In another embodiment, upon the hood being in the closed position, the hood defines a gap between an internal surface of the hood and an outer surface of the one or more baffles. In yet another embodiment, the frame includes at least one of a first side shelf and a second side shelf coupled to left and right sides, respectively, of the frame such that the one or more baffles substantially prevent heat from moving directly over the at least one of the first side shelf and the second side shelf.

In accordance with another embodiment of the present invention, an outdoor cooking station configured to channel heat is provided. The outdoor cooking station includes a frame, a griddle, and one or more baffles. The frame extends to define a front side, a rear side, a left side and a right side each extending between a lower end and an upper portion of the frame. The frame includes one or more heating elements supported by the frame. Further, the frame includes a hood pivotably coupled to the rear side of the frame such that the hood is moveable between a closed position and an open position. The griddle is configured to be supported by the upper portion of the frame and positioned above the one or more heating elements. The one or more baffles extends adjacently along an outer periphery of the griddle. With this arrangement, the one or more baffles are configured to funnel heat from under the griddle to a region above the griddle.

In one embodiment, upon the hood being in the closed position, the hood is positioned over the griddle and the one or more baffles. In another embodiment, upon the hood being moved to the closed position, the one or more baffles are configured to direct heat upward to above the griddle and under the hood.

In another embodiment, the griddle includes a cooking surface with a splash guard extending upward from the cooking surface, the splash guard extending along an entire periphery of the griddle. In another embodiment, the hood is pivotably coupled to the one or more baffles such that the hood, upon being in the closed position, is positioned over the one or more baffles and the griddle.

In another embodiment, the cooking station further includes at least one of a first side shelf and a second side shelf, the at least one of the first and second side shelves positioned along the first and second sides, respectively, of the frame. In another embodiment, the one or more baffles substantially prevents heat from moving laterally over the at least one of the first and second side shelves.

In another embodiment, the one or more heating elements includes at least one of gas flame burners and an electrical heating element. In another embodiment, the frame includes panels coupled thereto to define a cabinet structure below the one or more heating elements. In yet another embodiment, the one or more baffles define upward extending walls and a top side wall, the upward extending walls each extending to define an open-ended bottom side and the top side wall defining vents therein, the top side wall extending at a level above a cooking surface of the griddle.

In accordance with another embodiment of the present invention, a method for channeling heat in an outdoor cooking station is provided. The method includes the steps of: providing a frame extending to define a front side, a rear side, a first side and a second side each extending between a lower end and an upper portion of the frame of the outdoor cooking station, the frame including one or more heating elements supported by the frame, the frame having a hood pivotably coupled to the rear side of the frame such that the hood is moveable between a closed position and an open position, the frame configured to support a griddle such that the griddle is positioned above the one or more heating elements, the frame including one or more baffles coupled thereto and extending along a periphery of the griddle; positioning the hood in the closed position; and channeling heat from the one or more heating elements from below the griddle and through the one or more baffles to a region above the griddle and under the hood.

In another embodiment, the positioning step includes the step of pivotably moving the hood to the closed position so that the hood covers the griddle and the one or more baffles. In another embodiment, the positioning step includes the step of positioning the hood over the griddle to cover a splash guard extending directly upward from a cooking surface of the griddle, the splash guard extending along an entire periphery of the griddle. In still another embodiment, the providing step includes the step of providing the frame with at least one of a first side shelf and a second side shelf coupled to respective first and second sides of the frame. In a further embodiment, the method includes the step of positioning the hood in the open position such that heat is channeled to above the griddle to minimize heat moving over the at least one of the first side shelf and the second side shelf.

In accordance with another embodiment of the present invention, an outdoor cooking station configured to channel heat is provided. The cooking station includes a frame, a griddle, and first and second baffles. The frame extends to define a front side, a rear side, a left side and a right side each extending between a lower end and an upper portion. Further, the frame includes multiple heating elements controlled along the front side and coupled to the upper portion of the frame. The griddle is configured to be supported by the upper portion of the frame and is positioned above the heating elements. The griddle includes a cooking surface extending between a first end and a second end and between a front end and a rear end, the first end extending parallel relative to the second end and the front end extending parallel relative to the rear end. Further, the griddle includes a splash guard extending directly upward from the cooking surface. The first and second baffles each longitudinally extend along the first side and the second side, respectively, of the upper portion of the frame and adjacently along the splash guard of the griddle adjacent to the respective first and second end of the griddle, the first and second baffles configured to funnel heat from under the griddle to above the splash guard of the griddle.

In another embodiment, the cooking station includes a hood, the hood sized and configured to be positioned over the griddle and the first and second baffles. In another embodiment, the cooking station includes a hood, the hood pivotably coupled to the rear side of the frame such that, upon the hood being in a closed position, the hood covers each of the griddle and the first and second baffles. In a further embodiment, upon the hood being in the closed position, the hood defines a gap between an internal surface of the hood and an outer surface of each of the first and second baffles. In yet another embodiment, the frame includes at least one of a first side shelf and a second side shelf coupled to first and second sides, respectively, of the frame such that the first and second baffles substantially prevent heat from moving directly over the at least one of the first side shelf and the second side shelf.

In accordance with another embodiment of the present invention, an outdoor cooking station configured to channel heat is provided. The outdoor cooking station includes a frame, a griddle, and first and second baffles. The frame extends to define a front side, a rear side, a left side and a right side each extending between a lower end and an upper portion. Further, the frame includes multiple heating elements controlled along the front side and coupled to the upper portion of the frame, the rear side of the frame including a hood pivotably coupled thereto that is moveable between a closed position and an open position. The griddle is configured to be supported by the upper portion of the frame and positioned above the heating elements. The first and second baffles extend along the first side and the second side, respectively, of the upper portion of the frame and adjacently along an outer periphery of the griddle, the first and second baffles configured to funnel heat from under the griddle to a region above the griddle.

In another embodiment, upon the hood being in the closed position, the hood is positioned over the griddle and the first and second baffles. In another embodiment, upon the hood being moved to the closed position, the first and second baffles are configured to direct heat upward to above the griddle and under the hood.

In another embodiment, the griddle includes a cooking surface with a splash guard extending directly upward from the cooking surface along an entire periphery of the griddle. In another embodiment, the griddle includes a splash guard extending directly upward from a periphery of the griddle such that the first and second baffles extend alongside oppositely positioned first and second splash guards of the splash guard. In another embodiment, each of the first and second baffles define upward extending walls and a top side wall, the upward extending walls each extending from an open-ended bottom side and the top side wall defining vents therein, the top side wall extending at a level above the griddle.

In another embodiment, the frame further includes at least one of a first side shelf and a second side shelf, the at least one of the first and second side shelves positioned along the first and second sides, respectively, of the frame. In a further embodiment, the first and second baffles substantially prevents heat from moving laterally over the at least one of the first and second side shelves. In another embodiment, the lower portion of the frame includes wheels coupled thereto. In another embodiment, the lower portion of the frame includes panels coupled thereto to define a cabinet structure. In another embodiment, the heating elements comprise gas flame burners.

In accordance with another embodiment of the present invention, a method for channeling heat in an outdoor cooking station is provided. The method stems including: providing a frame extending to define a front side, a rear side, a first side and a second side each extending between a lower end and an upper portion of the frame of the outdoor cooking station, the frame including multiple heating elements controlled along the front side and coupled to the upper portion of the frame, the rear side of the frame including a hood pivotably coupled thereto and moveable between a closed position and an open position, the frame configured to support a griddle on the upper portion of the frame and above the heating elements, the upper portion of the frame including a first baffle and a second baffle extending along the respective first and second sides of the frame and adjacently along an outer periphery of the griddle; positioning the hood in the closed position; and channeling heat from the heating elements from below the griddle and through the first and second baffles to a region above the griddle and under the hood.

In another embodiment, the positioning step includes pivotably moving the hood to the closed position so that the hood covers the griddle and the first and second baffles. In another embodiment, the positioning step includes positioning the hood over the griddle to cover a splash guard extending directly upward from a cooking surface of the griddle such that the splash guard extends along an entire periphery of the griddle. In another embodiment, the providing step includes providing the frame with at least one of a first side shelf and a second side shelf coupled to respective first and second sides of the frame. In another embodiment, the method further includes positioning the hood in the open position such that heat is channeled to above the griddle without the heat moving laterally directly over the at least one of the first side shelf and the second side shelf.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
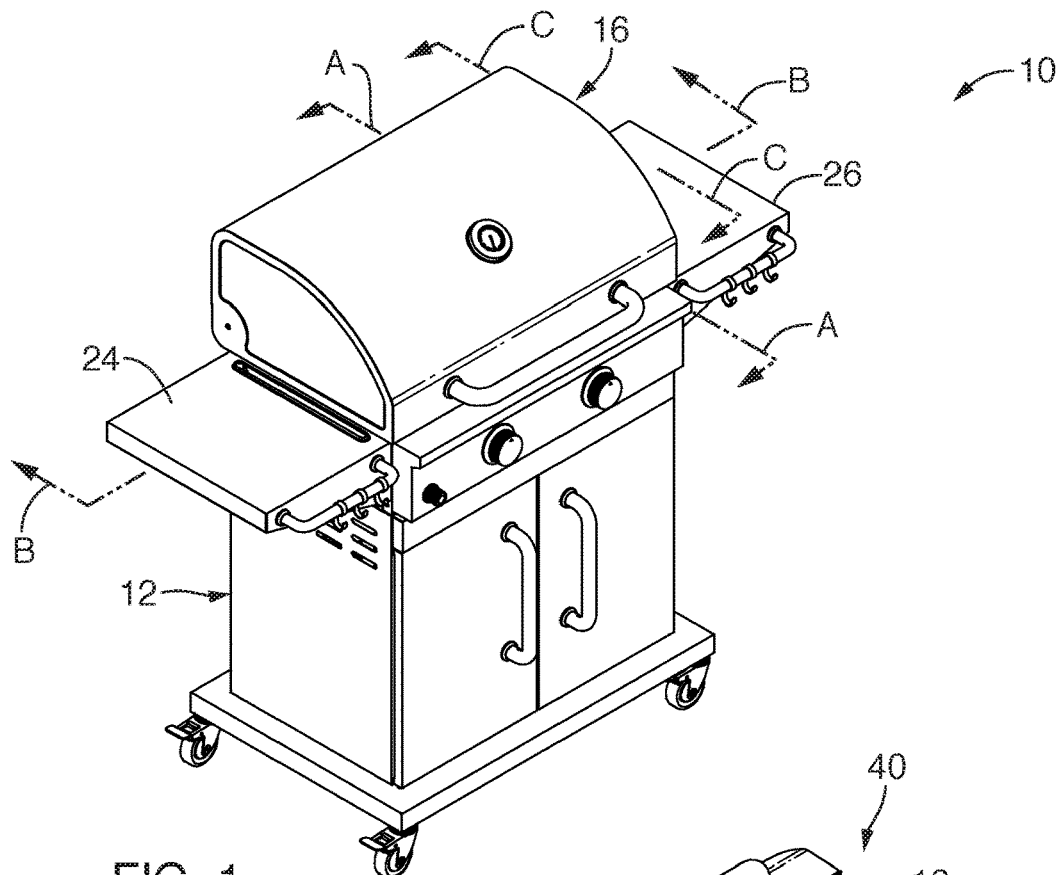
FIG. 1 is a perspective view of a cooking station with a hood, according to an embodiment of the present invention.
Figure 2:
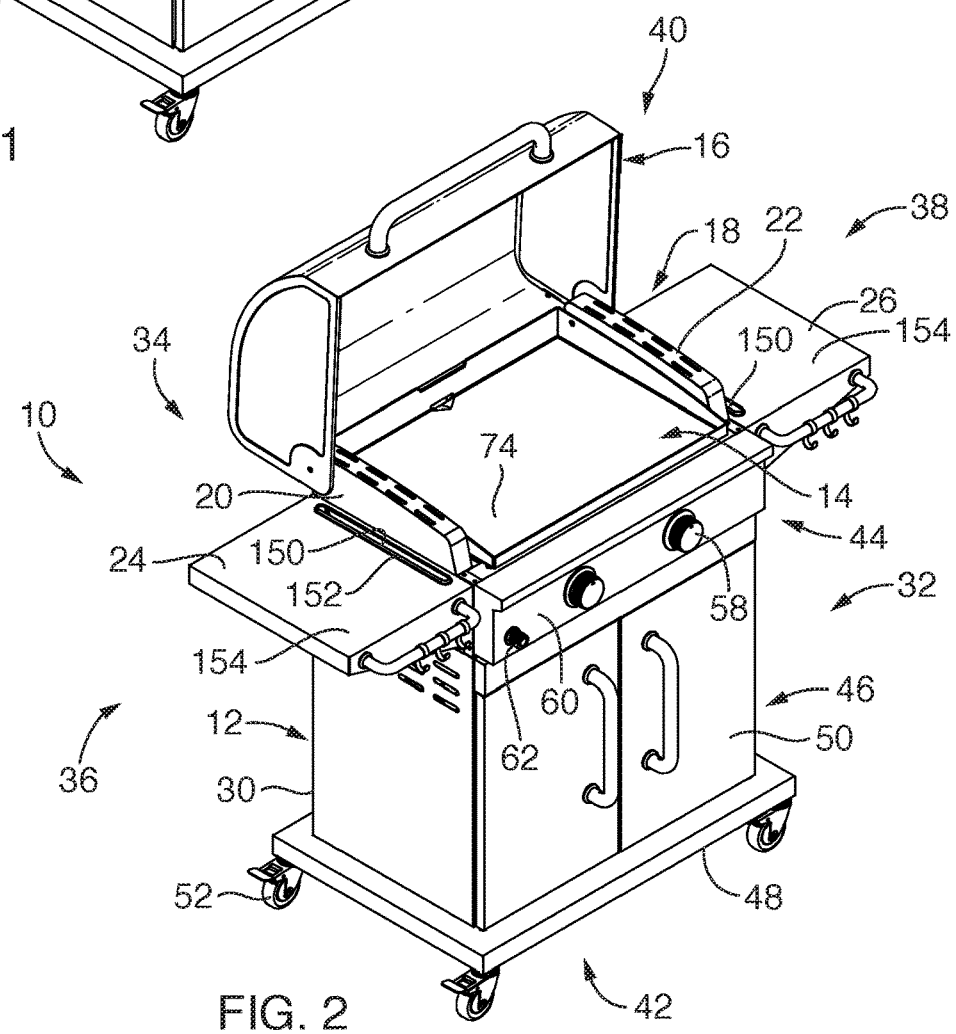
FIG. 2 is a perspective view of the cooking station with the hood in an open position, depicting a griddle positioned on the cooking station with first and second baffles positioned along sides of the griddle, according to another embodiment of the present invention.

Referring to FIGS. 1 and 2, an outdoor cooking station 10 having a frame 12 or main body of the type to support a griddle 14, is provided. The outdoor cooking station 10 of the present invention is sized and configured to channel heat from under the griddle 14 and upward to a region 18 above the griddle 14. In one embodiment, the cooking station 10 may include a hood 16 that is moveable between a closed position and an open position, the hood at least being operatively coupled to the frame 12. Further, to facilitate channeling heat to the region 18 above the griddle 14, the cooking station 10 may include one or more baffles, such as first and second baffles 20, 22, positioned along opposite sides of the griddle 14 such that, upon the hood 16 being in the closed position, the first and second baffles 20, 22 may channel heat from under the griddle 14 to above the griddle 14 and below the hood 16. Also, upon the hood 16 being in the open position, the first and second baffles 20, 22 substantially prevent heat from billowing laterally from the griddle 14, thereby, providing a safety feature relative to items that may be placed adjacent the griddle 14, for example, on a first side shelf 24 and a second side shelf 26 positioned on opposite sides of the griddle 14. With this arrangement, the first and second baffles 20, 22 are advantageous with the hood 16 in the open and closed positions for channeling heat from the cooking station 10 to the region 18 above the griddle 14. In other embodiments, the cooking station 10 may include one, two, three or four baffles positioned along one or more of the sides of the griddle 14 for channeling heat above the griddle 14.

Figure 3:
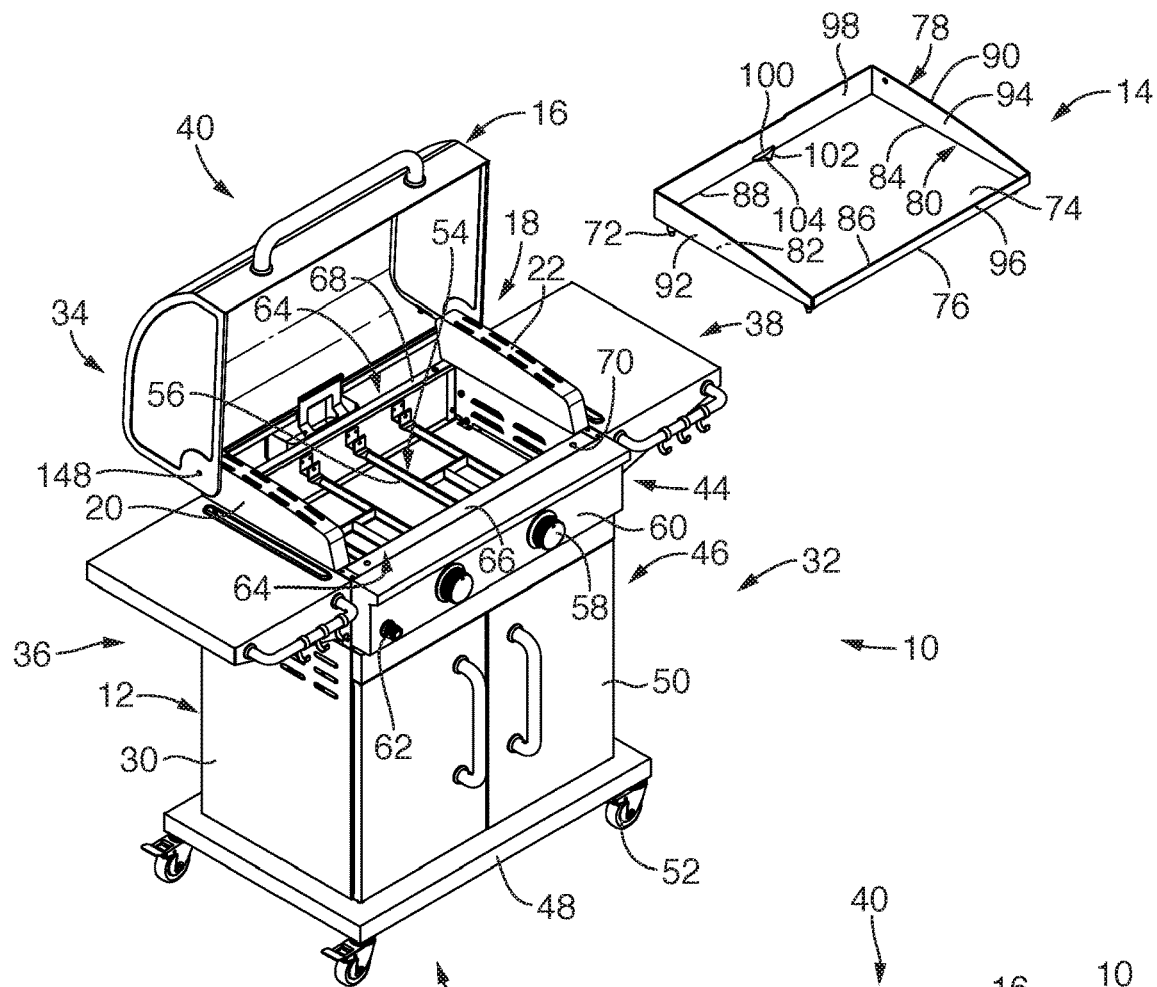
FIG. 3 is a perspective view of the cooking station with the griddle removed from an upper portion of the cooking station, depicting heating elements positioned within the upper portion of the cooking station, according to another embodiment of the present invention.
Figure 4:
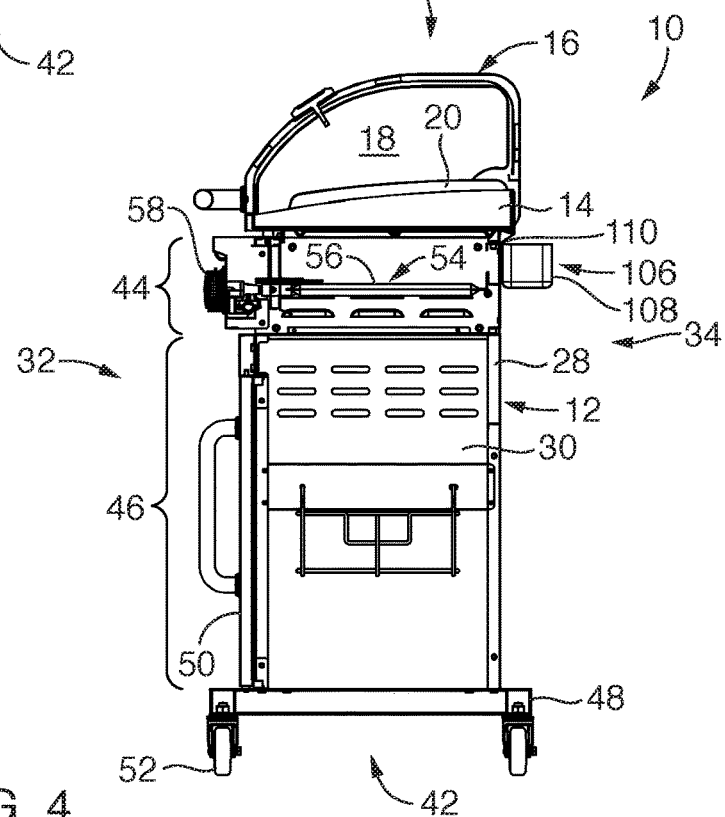
FIG. 4 is a side cross-sectional view of the cooking station taken along section line A-A of FIG. 1, according to another embodiment of the present invention.

With reference to FIGS. 2, 3 and 4, the frame 12 of the outdoor cooking station 10 may include various frame components 28 and panels 30 so as to longitudinally extend, horizontally and vertically, to define at least a partial box-like enclosure. Such frame 12 may extend along a front side 32, a rear side 34, a first side 36, a second side 38, a top side 40 and a bottom side 42 of the frame 12, the front side 32 being opposite the rear side 34, the first side 36 being opposite the second side 38 and the top side 40 being opposite the bottom side 42. Further, the partial box-like enclosure of the frame 12 may extend to define an upper portion 44 and a lower portion 46. The lower portion 46 of the frame 12 may define a cabinet like structure that may extend to a lower end 48. Such cabinet like structure may include doors 50 and/or drawers or the like. For example, doors 50 may provide access to a propane tank (not shown) within the cabinet like structure. Further, the lower end 48 of the frame 12 may include two or more wheels 52, such as caster wheels, to facilitate portability of the outdoor cooking station 10.

The upper portion 44 of the frame 12 may house various components of the cooking station 10. For example, the various components for heating the cooking station 10 may be typical cooking station components with one or more heating elements 54, such as gas flame burners 56 and/or an electrical heating element that may be employed for generating heat, such as heated smoke, from other types of fuel sources, such as pellets, wood, and/or charcoal, as known to one of ordinary skill in the art. Such heating elements 54 may be supported by the frame 12 to be positioned below the griddle 14. In one embodiment, the frame 12 may be coupled to and support multiple burners 56 each associated with and controlled with burner control valves 58 or knobs along a front panel 60, for example, such that the multiple burners 56 may be operated and controlled along the front side 32 of the frame 12. The front panel 60 may also include an igniter button 62 with functionality and structure, as known by one skilled in the art. The burner control valves 58 may be configured to control pressurized gas flow, via valves and tubing (not shown), through corresponding burners 56 by turning knobs of the burner control valves 58 to various open positions and a closed position. For example, turning the knob clockwise may increase the amount of gas provided through the burners and turning the knob counter-clockwise may decrease gas flow until reaching a hard stop at the closed or off position. Each burner knob may be associated with various valves and a manifold coupled to a fuel source, such as natural gas or propane gas, typically provided in open gas flame cooking stations, as known to one of ordinary skill in the art.

The upper portion 44 of the frame 12 may define an upper edge 64. In one embodiment, the upper edge 64 may include a front upper edge 66 and a rear upper edge 68 each with a flat upward facing surface. The front upper edge 66 may be positioned along the front side 36 of the frame 12 extending between the first and second sides 36, 38 of the frame 12. Similarly, the rear upper edge 68 may be positioned along the rear side 34 of the frame 12 extending between the first and second sides 36, 38 of the frame 12. Between opposite end portions of each of the front and rear upper edges 66, 68, the first and second baffles 20, 22 may be positioned and secured to the frame 12. For example, the first baffle 20 may be elongated so as to extend along the first side 36 of the frame 12 so that opposite ends of the first baffle 20 may be positioned adjacent to one end portion of the front upper edge 66 and one end portion of the rear upper edge 68. Likewise, the second baffle 22 may be elongated so as to extend along the second side 38 of the frame 12 such that opposite ends of the second baffle 22 may be positioned adjacent to the other end portion of the front upper edge 66 and the other end portion of the rear upper edge 68. Further, each of the first and second baffles 20, 22 may extend upward at a level above the front and rear upper edges 66, 68. With this arrangement, the front and rear upper edges 66, 68 and the first and second baffles 20, 22 define a space for positioning the griddle 14 onto the upper portion 44 of the frame 12 such that opposite sides of the griddle 14 may be positioned between the first and second baffles 20, 22. Further, to ensure appropriate stabilization of the griddle 14 on the upper edge 64 of the frame 12, each of the front and rear upper edges 66, 68 may define two apertures 70 spaced so as to correspond with griddle legs 72 extending downward from an underside of the griddle 14. In this manner, such apertures 70 may be sized and configured to receive the griddle legs 72 therein so that the griddle 14 is appropriately positioned and supported by the upper edge 64 of the frame 12.

Now with reference to FIGS. 2 and 3, as set forth, the griddle 14 may be sized and configured to be positioned between the first and second baffles 20, 22 and be supported on the upper edge 64 of the frame 12. The griddle 14 may be formed of relatively thick plate material defining an upward facing flat cooking surface 74 and an opposite underside surface 76 with a splash guard 78 extending directly upward from the cooking surface 74. The cooking surface 74 may define a cooking surface periphery 80, the cooking surface 74 extending between first and second ends 82, 84 and front and rear ends 86, 88. The first end 82 may extend parallel relative to the second end 84 and the front end 86 may extend parallel relative to the rear end 88. In this manner, the flat cooking surface 74 may define a generally rectangular shape or square shape.

As set forth, the griddle 14 may include a splash guard 78 extending upward from the cooking surface 74 so as to extend to a top edge 90 of the splash guard 78. In one embodiment, the top edge 90 of the splash guard may extend continuously above the cooking surface periphery 80. In another embodiment, the splash guard 78 may extend above and along the cooking surface periphery 80 so as to extend along each of the first and second ends 82, 84 and front and rear ends 86, 88 of the griddle 14. As such, the splash guard 78 may extend to define a first splash guard 92, a second splash guard 94, a front splash guard 96 and a rear splash guard 98. In another embodiment, the rear splash guard 98 may extend higher than the front splash guard 96 such that the first and second splash guards 92, 94 may vary in height at least partially along their respective lengths. In another embodiment, the top edge 90 of the first and second splash guards 92, 94 may be angled downward at least partially along a length of the first and second splash guards 92, 94.

With reference to FIGS. 2, 3 and 4, in another embodiment, the griddle 14 may define an opening 100 therein sized and configured to receive grease or food bi-product therethrough. In one embodiment, the opening 100 may be defined in the splash guard 78. In another embodiment, the rear splash guard 98 at least partially defines the opening 100 therein. In another embodiment, the first and/or second splash guards 92, 94 may define an opening therein, similar to opening 100. Further, in another embodiment, adjacent the opening 100, the cooking surface 74 may extend with a sloped surface 102 to define a trough 104. The sloped surface 102 may be sized and configured to funnel grease toward and through the opening 100 and into a grease container 106. The grease container 106 may define a container portion 108 and a latch portion 110, the latch portion 110 sized and configured to suspend the container portion 108 of the grease container 106 below the opening 100. For example, the latch portion 110 may be removably coupled to either the griddle 14 or the rear side 34 of the frame 12. In this manner, the cooking station 10 may include components, such as the griddle 14 having the splash guard 78 and opening 100 defined therein, and the grease container 106, for managing the grease and related food bi-products associated with cooking. Similar grease managing components are disclosed in commonly owned U.S. Pat. Nos. 10,327,588 and 10,327,589, the disclosures of which are incorporated by reference herein in their entireties.

Figure 8:
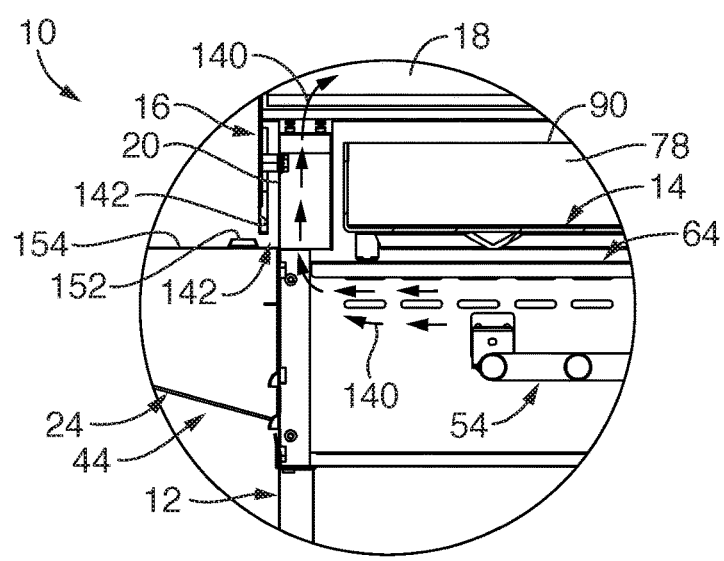
FIG. 8 is an enlarged view of the cooking station taken from region A of FIG. 7, according to another embodiment of the present invention.

Now with reference to FIGS. 2 and 8, as previously set forth, the frame 12 or main body of the cooking station 10 may include the first and second side shelves 24, 26 positioned along respective first and second sides 36, 38 of the cooking station 10. Each of the first and second side shelves 24, 26 may define an elongated opening 150 therein, extending longitudinally along the respective first and second sides 36, 38 between the front and rear sides 32, 34 of the cooking station 10. Such elongated opening 150 may include a ridge 152 extending upward from and relative to an upward facing flat surface 154 of each of the first and second side shelves 24, 26. Further, as depicted, the ridge 152 may extend along an upper side of a periphery of the elongated opening 150 in a continuous manner so as to completely surround the elongated opening 150. In another embodiment, the ridge 152 extending along the periphery of the elongated opening 150 may extend with a closed loop. In another embodiment, the elongated opening 150 may be a through hole so as to be completely surrounded by the upward facing flat surface 154 of the corresponding one of the first and second side shelves 24, 26. In another embodiment, the elongated opening 150 may be positioned a predetermined distance from the upper edge 64 of the cooking station 10 and within the upward facing flat surface 154 of the corresponding one of the first and second side shelves 24, 26. Such ridge 152 and elongated opening 150 arrangement may act as a safety feature to minimize objects being placed on the ridge 152 of the corresponding side shelf and, thus, too close to heat of the cooking station 10. Further, such ridge 152 and elongated opening 150 arrangement within one or more side shelves is further described and disclosed in commonly owned U.S. patent application Ser. No. 16/364,012, filed Mar. 25, 2019, entitled "OUTDOOR COOKING STATION, SIDE SHELF, AND METHOD THEREOF," the disclosure of which is incorporated by reference herein in its entirety.

Figure 5:
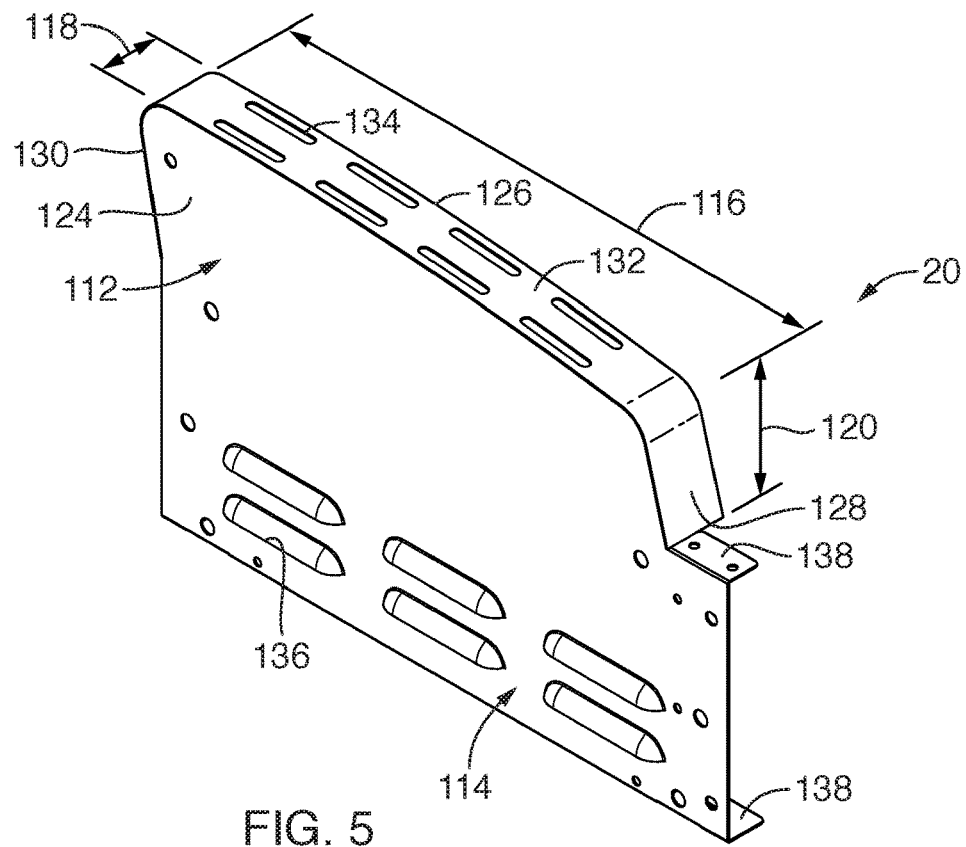
FIG. 5 is a front perspective view of a baffle, according to another embodiment of the present invention.
Figure 6:
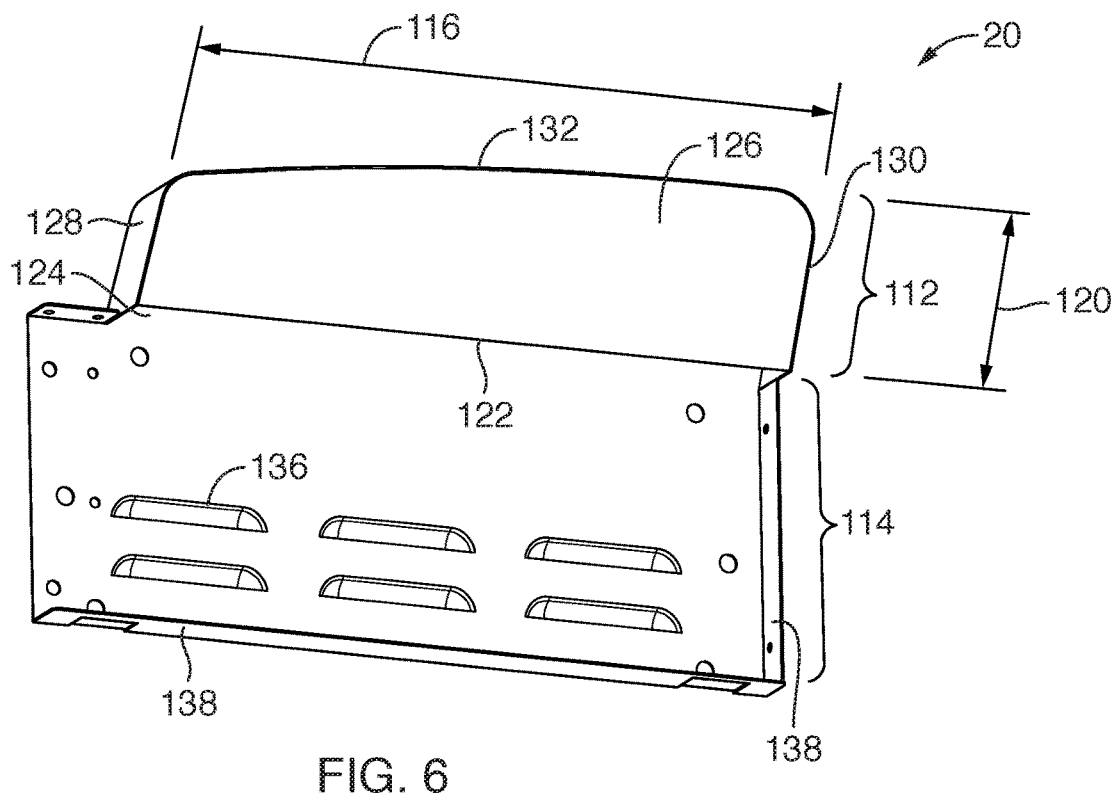
FIG. 6 is an underside perspective view of the baffle, according to another embodiment of the present invention.
Figure 7:
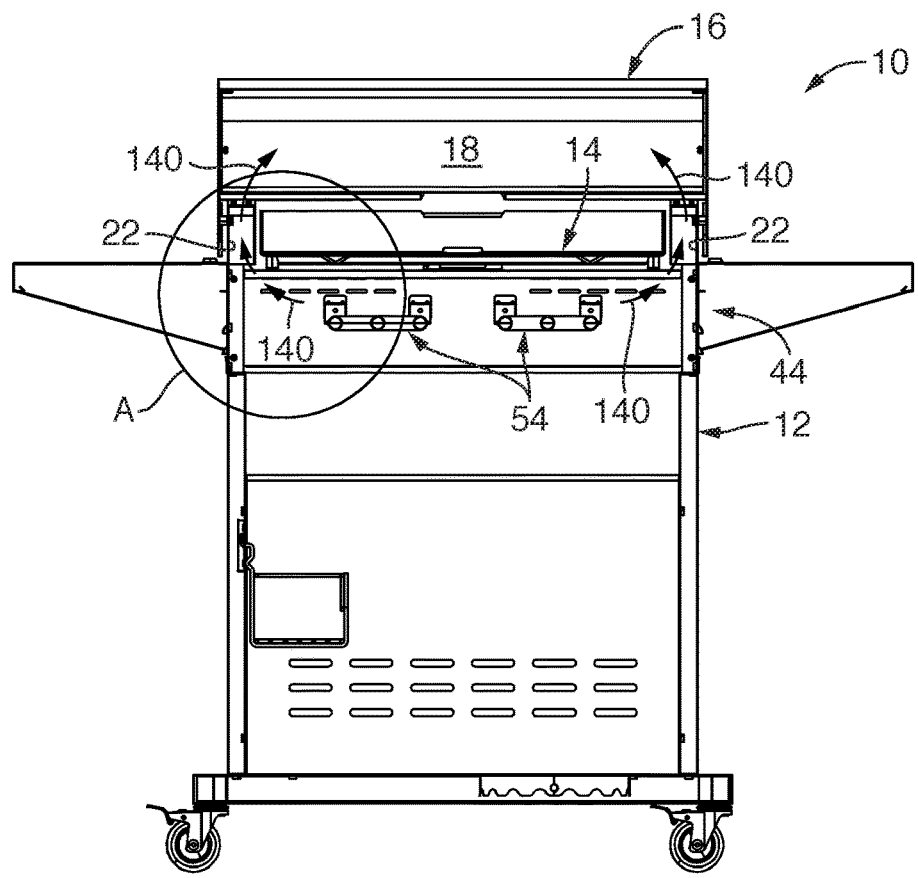
FIG. 7 is a front cross-sectional view of the cooking station taken along section line B-B of FIG. 1, according to another embodiment of the present invention.

With reference to FIGS. 3, 5 and 6, the first and second baffles 20, 22 will now be described. FIGS. 5 and 6 depict the first baffle 20, but may be applicable to both the first and second baffles 20, 22 since the second baffle 22 may mirror the first baffle 20. As set forth, the first and second baffles 20, 22 may be sized and configured to channel heat from below the griddle 14 to the region 18 above the griddle 14 and, as such, the first and second baffles 20, 22 may act as heat ducts. In one embodiment, each of the first and second baffles 20, 22 may extend to define a duct portion 112 and panel portion 114, the baffles configured to be oriented such that the panel portion 114 extends downward relative to the duct portion 112. In another embodiment, the first and second baffles 20, 22 may extend with only the duct portion 112, similar to the first and second baffles 202, 204 of FIG. 12, discussed herein. The duct portion 112 of each of the first and second baffles 20, 22 may extend with a length 116, a width 118 and a height 120, the duct portion 112 being elongated to extend longitudinally along the length 116 so as to be longer than the width 118 and height 120 dimensions of the duct portion 112. Further, the height 120 of the duct portion 112 may be longer than the width 118. Such duct portion 112 may exhibit a generally narrow box-like structure with an open side 122, the open side 122 sized and configured to receive heat from adjacently below the griddle 14. For example, the duct portion 112 of each of the first and second baffles 20, 22 may be defined with an outer panel 124, an inner panel 126, a front panel 128, a rear panel 130 and a top panel 132. The outer panel 124 may be positioned opposite the inner panel 126 and the front panel 128 may be positioned generally opposite the rear panel 130, although the front and rear panels 128, 130 may be somewhat angled relative to each other. The top panel 132 may be opposite a bottom side, the bottom side defining the open side 122 or open end of the duct portion 112. The top panel 132, being oppositely positioned relative to the open side 122, may define vents 134 therein sized and configured to facilitate venting heat therethrough.

As set forth, the first and second baffles 20, 22 may include the panel portion 114 associated with the duct portion 112. For example, the panel portion 114 may, at least partially, be a seamless extension of the outer panel 124 of the duct portion 112, the panel portion 114 extending downward from the outer panel 124 so as to act as a side panel for enclosing a portion of the upper portion 44 of the frame 12. In another embodiment, the panel portion 114 may be a separate panel that may be coupled to the outer panel 124 of the duct portion 112. Further, the panel portion 114 may include air vents 136 defined therein, the air vents 136 sized and configured to draw external air to the heating elements 54 to facilitate effective burning of fuel associated with the heating elements 54. The first and second baffles 20, 22 may also define various flanges, brackets or extensions 138 sized and configured to facilitate securing the first and second baffles 20, 22 to the frame 12 of the cooking station 10.

Now with reference to FIGS. 2, 3, 7 and 8, as previously set forth, the first and second baffles 20, 22 may be secured to the upper edge 64 or upper portion 44 of the frame 12 so that the griddle 14 may be positioned between the first and second baffles 20, 22 on the upper edge 64 of the frame 12 of the cooking station 10. The first and second baffles 20, 22 may be sized to extend to a similar height or higher than the top edge 90 of the splash guard 78 of the griddle 14. Each of the first and second baffles 20, 22 may be elongated such that the length 116 of the first and second baffles 20, 22 extend from adjacent the front splash guard 96 to adjacent the rear splash guard 98 so as to extend substantially along the length of the respective first and second splash guards 92, 94. Further, the first and second baffles 20, 22 may be positioned to be adjacent the griddle 14 so that, upon the hood 16 being moved to the closed position (FIG. 1), the hood 16 covers and/or surrounds each of the first and second baffles 20, 22 and the griddle 14. As such, with the first and second baffles 20, 22 positioned adjacently alongside each of the first and second splash guards 92, 94 of the griddle 14, heat from the heating elements 54 may flow along the underside surface 76 of the griddle 14 and through the open side 122 of the first and second baffles 20, 22, as shown by arrow 140, and continue flowing upward through the vents 134 defined in the top panel of the baffles so that the heat may be funneled to the region 18 above the griddle 14. With this arrangement, the heat may substantially be prevented from bellowing laterally toward and over the first and second side shelves 24, 26. Further, upon the hood 16 being moved to the closed position (FIG. 1), the first and second baffles 20, 22 may be positioned with a small gap 142 between the outer panel 124 of the first and second baffles 20, 22 and an inner surface of the hood 16. As such, the first and second baffles 20, 22 may substantially prevent side walls of the hood 16 from damage by being over-heated. Further, the first and second baffles 20, 22 may effectively funnel the heat from under the griddle 14 to the region 18 above the griddle 14 and, upon the hood 16 being in the closed position, provide additional heat under the closed hood 16.

Figure 9:
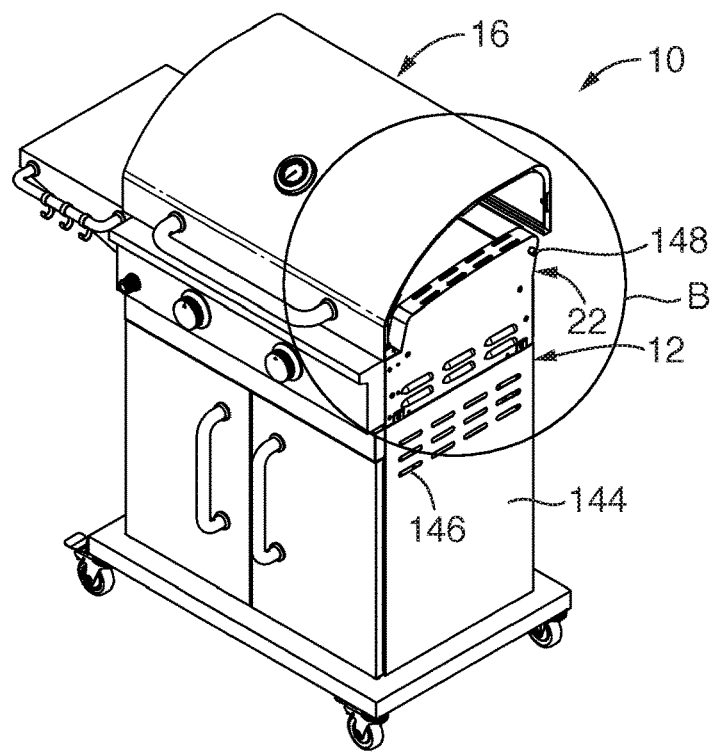
FIG. 9 is a perspective cross-sectional view taken along section line C-C of FIG. 1, according to another embodiment of the present invention.
Figure 10:
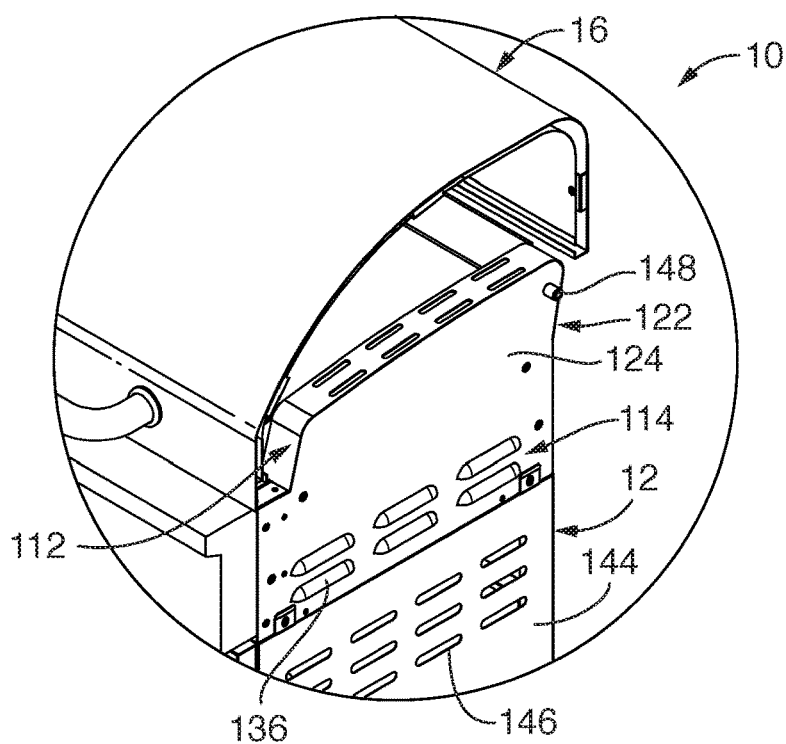
FIG. 10 is an enlarged view of the cooking station taken from region B of FIG. 9, according to another embodiment of the present invention.

With reference to FIGS. 3, 9 and 10, as set forth the panel portion 114 of the first and second baffles 20, 22 may be a continuous extension from the outer panel 124 of the duct portion 112 of the first and second baffles 20, 22. Further, the panel portion may 114 define the air vents 136 therein to draw appropriate air to the heating elements 54. Further, the cooking station 10 may include lower panels 144 defining, for example, a cabinet portion of the cooking station 10, with venting structure 146 defined within such lower panels 144, the venting structure 146 also facilitating air flow to the heating elements 54. Further, in one embodiment, the first and second baffles 20, 22 may include pivoting structure 148 coupled thereto and positioned adjacent an upper rear portion of the first and second baffles 20, 22. Such pivoting structure 148 may be sized and configured to be coupled to a rear side of the hood 16 so that the hood 16 may be pivotably coupled to the first and second baffles 20, 22 and, otherwise said, to the frame 12 or main body of the cooking station 10.

With reference to FIGS. 1-3, in another embodiment, the one or more heating elements 54 of the cooking station 10 may include heating elements in addition to (or instead of) the gas flame burners 56, described herein. For example, the one or more heating elements 54 may include an electrical heating element sized and configured to burn pellets or the like to create heat, such as heated smoke, to provide flavor to food being cooked on the griddle 14. As set forth herein, the first and second baffles 20, 22 may channel the heated smoke therethrough to the region 18 above the griddle and below the hood 16. Similar features including electrical heating elements for creating heated smoke and/or heat channeling systems are disclosed in commonly owned U.S. patent application Ser. No. 16/428,605, filed May 31, 2019, entitled "OUTDOOR COOKING STATION WITH MULTIPLE INDEPENDENT COOKING MODES AND METHOD THEREOF," and U.S. Provisional Patent Application No. 63/033,690, filed Jun. 2, 2020, entitled "OUTDOOR COOKING STATION FOR SMOKING FOOD AND METHOD THEREOF," the disclosures of which are each incorporated by reference herein in their entirety.

Figure 11:
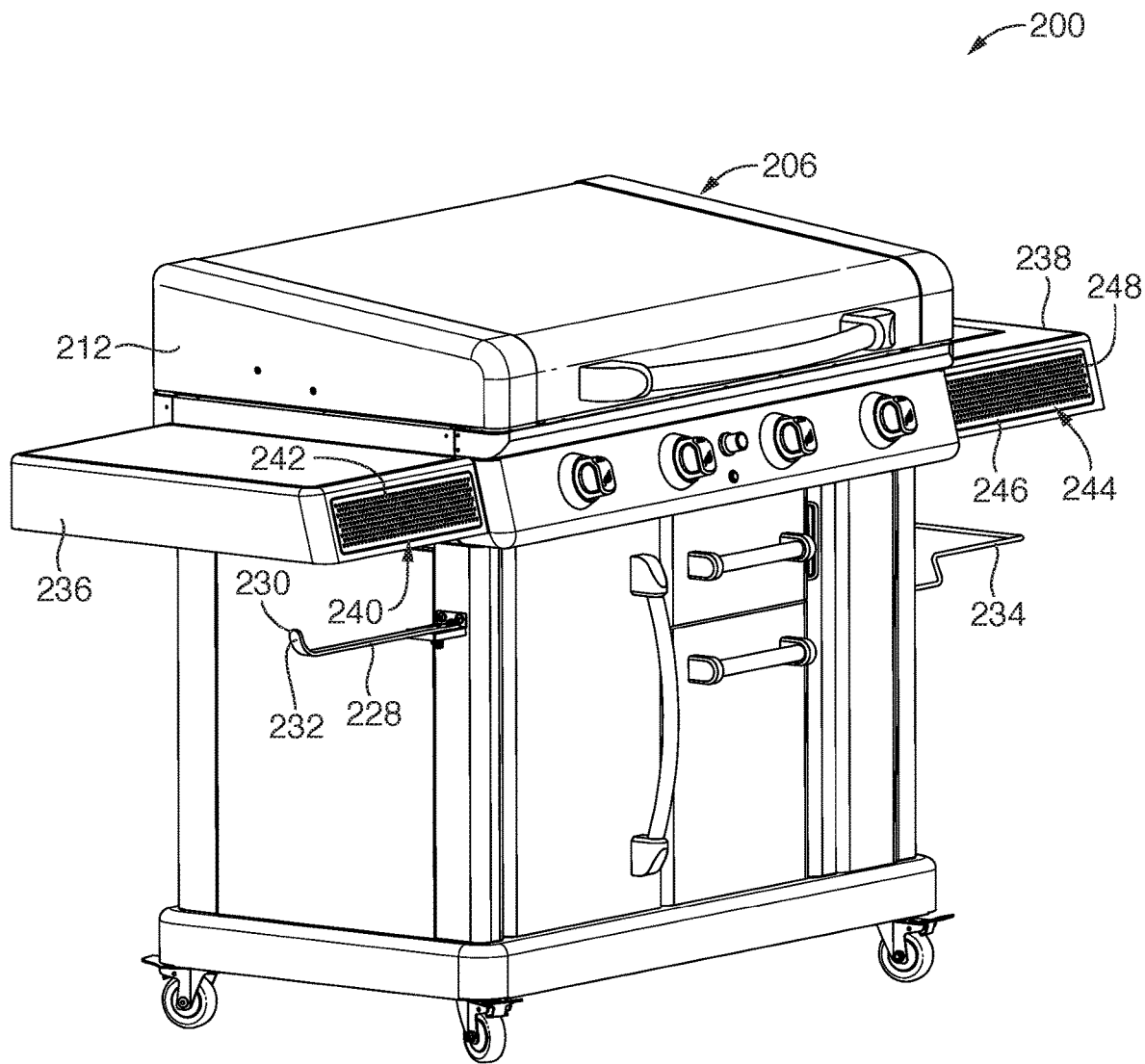
FIG. 11 is a perspective view of another embodiment of a cooking station with a hood in a closed position, according to the present invention.
Figure 12:
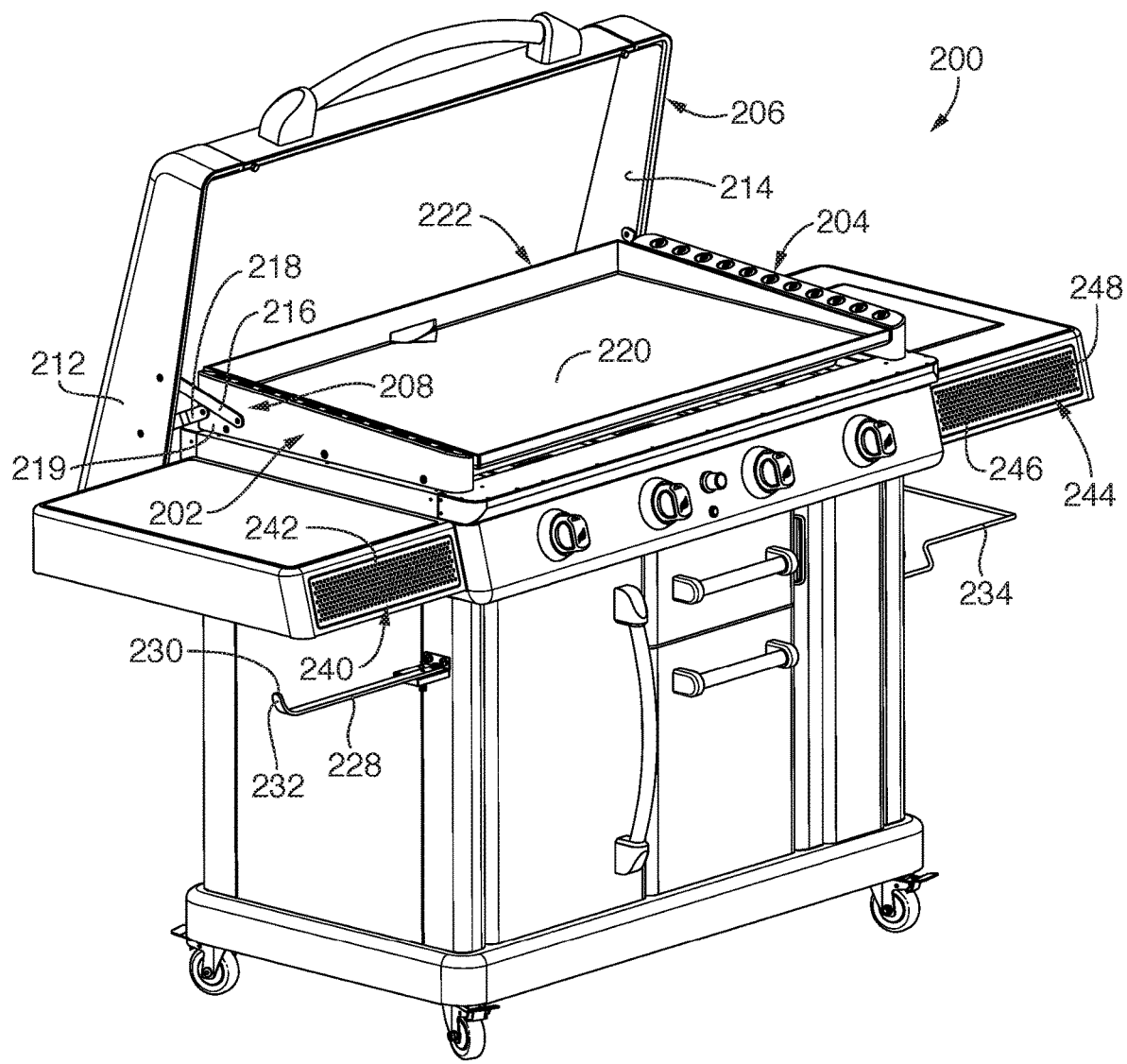
FIG. 12 is a perspective view of the cooking station of FIG. 11, depicting the hood in an open position and pivotably coupled to the main body of the cooking station with a dual linkage, according to another embodiment of the present invention.
Figure 13:
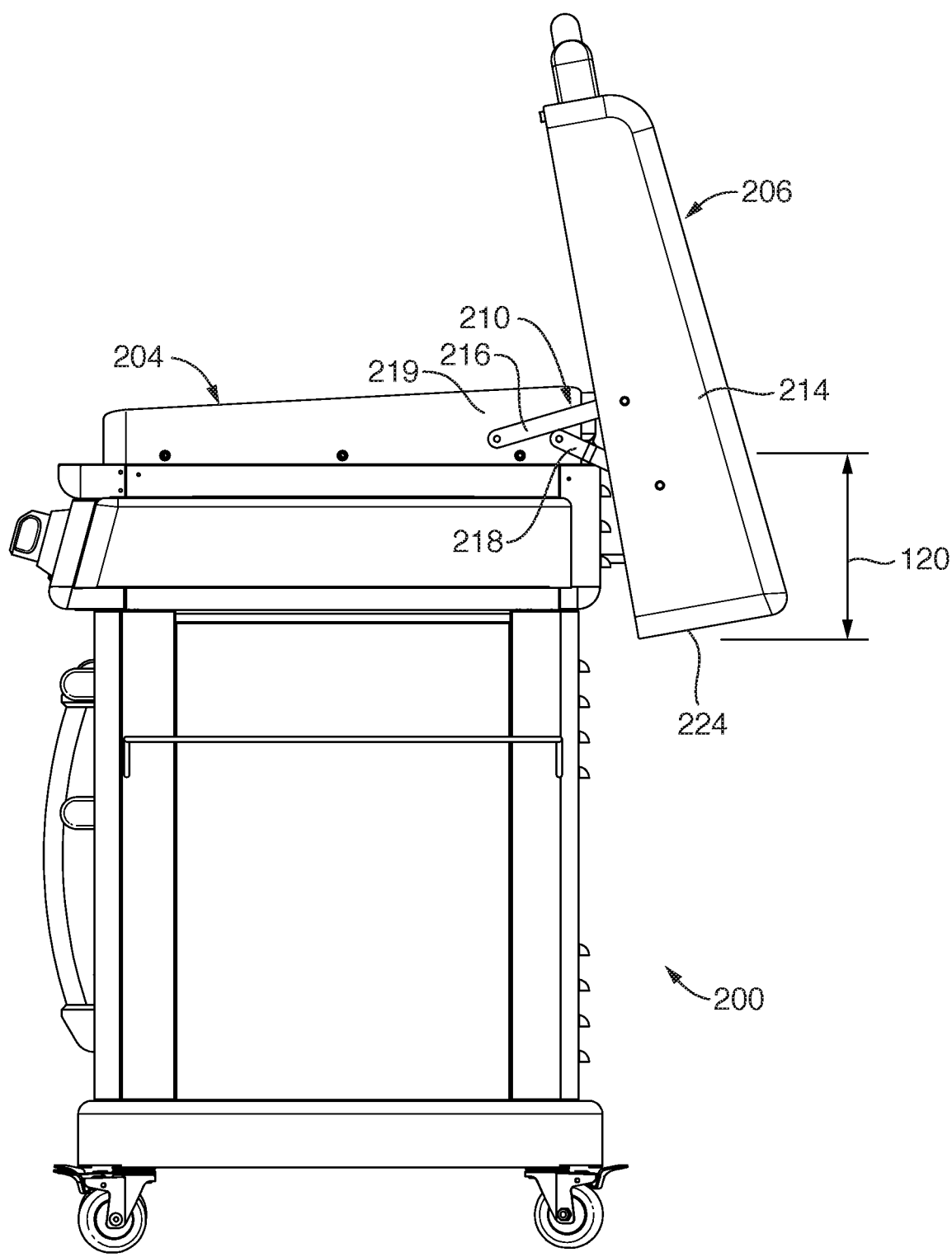
FIG. 13 is a side view of the cooking station of FIG. 11, depicting the hood in the open position and in a low rearward position via the dual linkage coupling the hood to the main body of the cooking station, according to another embodiment of the present invention.

With reference to FIGS. 11-13, another embodiment of an outdoor cooking station 200 is provided. The outdoor cooking station 200 may include first and second baffles 202, 204 with a hood 206 pivotably coupled thereto, similar to the previous embodiment. In this embodiment, the pivotable connection of the hood 206 may be employed with a dual linkage, such as a first dual linkage 208 (see FIG. 12) and a second dual linkage 210 (see FIG. 13). The first dual linkage 208 may couple a first side wall 212 of the hood 206 to the first baffle 202. Similarly, the second dual linkage 210 may couple a second side wall 214 of the hood 206 to the second baffle 204. With this arrangement, the hood 206 may be readily moved between a closed position (FIG. 11) and an open position (FIG. 12). Each of the first and second dual linkages 208, 210 may include a forward link 216 and a rearward link 218. The forward and rearward links 216, 218 may be elongated structures each extending with opposing end portions, the opposing end portions being pivotably coupled to a rear end portion 219 of one of the first and second baffles 202, 204 and a corresponding one of the first and second side walls 212, 214 of the hood 206.

With the hood 206 in the closed position, the hood 206 may be positioned to surround and cover a cooking surface 220 of, for example, a griddle 222 (and/or a grill) as well as the first and second baffles 202, 204. Similar to the previous embodiment, the first and second baffles 202, 204 may be sized and configured to channel heat from one or more heating elements below the cooking surface 220 to a position above the cooking surface 220 through vents defined along an upper side of a duct portion, as in the previous embodiment. In this embodiment, the first and second baffles 202, 204 may only include the duct portion for channeling the heat with various flanges or brackets sized to interconnect and couple the first and second baffles 202, 204 to the framework of the cooking station 200, rather than both duct and panel portions of the first and second baffles 20, 22 as described relative to FIGS. 3, 5 and 6. As in the previous embodiment, the first and second baffles 202, 204 may be employed for channeling heat to food above the cooking surface 220 when the hood 206 is in the closed position. Further, the first and second baffles 202, 204 may be sized and configured to minimize heat damage to the first and second side walls 212, 214 of the hood 206, similar to the previous embodiment.

With the hood 206 in the open position, such as a fully open position, the dual linkage arrangement facilitates the hood 206 to be moved to a low profile open position (such as a fully open position), as depicted in FIGS. 12 and 13. In the low profile open position, the first and second dual linkages 208, 210 facilitate a rear side wall 224 or rear end of the hood 206 to be positioned a rear depth 226 below the griddle 222 such that the hood 206 is positioned rearward of the griddle 222 and the first and second baffles 202, 204. Such rear depth 226 of the hood 206 positioned below the griddle 222 may assist in minimizing a height of the hood 206 above the griddle 222, thereby, minimizing risk of wind unintentionally moving the hood 206 relative to the griddle 222. Similar features of a cooking station with a hood having a pivotable connection via first and second dual linkages is disclosed in commonly owned U.S. Provisional Patent Application No. 62/975,143, filed Feb. 11, 2020, the contents of which are incorporated by reference herein in their entirety.

In another embodiment, the cooking station 200 may include a laterally extending arm 228 that may extend from one side of the cooking station 200, such as below a side shelf. The laterally extending arm 228 may be coupled to the one side of the cooking station 200 with a free end 230 having an upward extending hook 232. The arm 228 may be sized and configured to receive, for example, a paper towel roll, or the arm 228 may be readily employed as a towel holder. In another embodiment, the cooking station 200 may include a waste bag holder 234 configured to be removably positioned along one of the sides of the cooking station 200. Such waste bag holder 234 may extend with a general u-shape with two end portions configured to hook to the cooking station 200 in a removable coupling manner. Such waste bag holder 234 is further disclosed in commonly owned U.S. patent application Ser. No. 16/366,991, filed Mar. 27, 2019, the contents of which are incorporated by reference herein in their entirety.

In another embodiment, the cooking station 200 may also include one or more magnetic portions coupled to a surface of the cooking station 200, such as a front surface along first and/or second side shelves 236, 238. For example, the first side shelf 236 may include a first magnetic portion 240 coupled to a first front surface 242 of the first side shelf 236. Similarly, the second side shelf 238 may include a second magnetic portion 244 coupled to a second front surface 246 of the second side shelf 238. The first and second magnetic portions 240, 244 may each extend with a flat structure with a relatively smooth outward facing surface 248. Such magnetic portions may be sized and configured to facilitate magnetically attaching cooking utensils (not shown) thereto in a suspending manner. The smooth outward facing surface 248 of the magnetic portion may readily facilitate cleaning the outer surface of the magnetic portion since such surface is likely to get food byproduct thereon from cooking utensils. Further, the first and second magnetic portions 240, 244 may be attached to the cooking station 200 with an adhesive.

Such first and second magnetic portions 240, 244 may be permanently adhesively attached to the cooking station 200. The magnetic portion, in one embodiment, may be sized to extend along most of the front surface of the first and/or second side shelves 236, 238 so as to exhibit a rectangular shape, but may also be sized to extend with various shapes along the front surface of the first and/or second side shelves 236, 238.

Various components of the cooking station 10, 200 may be formed of metallic materials and polymeric materials having high temperature ratings. For example, various components of the cooking station 10, 200 may be formed of various steel materials, such as stainless steel or the like, formed with paneling, extensions, cross-members, or any other suitable components, and may be coupled together via welding and/or with typical fasteners and/or bolts and the like. The griddle 14, 222 may also be formed from metallic materials, such as, carbon steel, cast iron, stainless steel, or aluminum, or various metal alloys, or any other suitable cooking surface material known in the art, such as porcelain coated materials. The metallic materials may be manufactured using cold rolled steel processes, or hot rolled steel techniques, or any other known manufacturing process, such as casting or stamping, as known in the art. The various plate components of the griddle 14, 222 may include a thickness of 5-6 millimeters, but is not so limited, as such thickness of the various components of the griddle may range, for example, between 4-10 millimeters. Also, portions of the griddle 14, 222 such as the trough 104, opening 100, and splash guard 78 may be formed by employing welding, cutting, stamping and bending techniques from sheet or plate material to form the griddle as well as forming portions to the of the griddle with welding techniques, or employing any other known process or techniques to form the griddle, as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station configured to channel heat, comprising:
    a frame extending to define a front side, a rear side, a first side and a second side each extending between a lower end and an upper edge, the frame including multiple gas flame burners controlled along the front side and coupled to the frame;
    a griddle configured to be supported by the frame and positioned above the gas flame burners and positioned above the upper edge of the frame, the griddle having a cooking surface and a splash guard extending upward from the cooking surface to a top edge of the splash guard, the splash guard extending to define a first side splash guard, a second side splash guard, a front side splash guard and a rear side splash guard, the first side splash guard extending parallel with the second side splash guard, and the front side splash guard extending parallel with the rear side splash guard;
    a hood sized and configured to be positioned over the griddle in a covered position, the hood having a top hood panel, a first side hood panel, a second side hood panel, and a front side hood panel, upon the hood being in the covered position, each of the first and second side hood panels extending downward from the top hood panel toward the respective first and second sides of the frame, and the front side hood panel extending downward from the top hood panel toward the front side of the frame, the hood positionable over the griddle in the covered position so that the first side hood panel extends downward and spaced relative to the first side splash guard to define a first side space therebetween and the second side hood panel extends downward and spaced relative to the second side splash guard to define a second side space therebetween; and
    a first duct unit and a second duct unit each including multiple duct panels sized and configured to channel heat from an underside of the griddle, wherein, upon the hood being in the covered position, the first duct unit is positioned between the first side hood panel and the first side splash guard so as to be positioned within the first side space such that the first duct unit extends upward from adjacently below the griddle, above the upper edge of the frame, and adjacent to the top edge of the first side splash guard, and the second duct unit is positioned between the second side hood panel and the second side splash guard to be positioned within the second side space such that the second duct unit extends upward from adjacently below the griddle, above the upper edge of the frame, and adjacent to the top edge of the second side splash guard, the first and second duct units being coupled to respective first and second sides of the frame and are configured to funnel heat from the gas flame burners under the griddle to above the cooking surface of the griddle so that the multiple duct panels of each of the first and second duct units act to shield and minimize heating of the first and second side hood panels of the hood, respectively, upon the hood being in the covered position.

2. The outdoor cooking station of claim 1, wherein the hood is pivotably coupled to the rear side of the frame such that, upon the hood being in the covered position, the hood covers each of the griddle and the first and second duct units.

3. The outdoor cooking station of claim 2, wherein, upon the hood being in the covered position, the hood defines a gap between an internal surface of the hood and an outer surface of the first and second duct units.

4. The outdoor cooking station of claim 1, wherein the frame includes at least one of a first side shelf and a second side shelf coupled to first and second sides, respectively, of the frame such that the first and second duct units substantially prevent heat from moving directly over the at least one of the first side shelf and the second side shelf.

5. An outdoor cooking station configured to channel heat, comprising:
    a frame extending to define a front side, a rear side, a first side and a second side each extending between a lower end and an upper edge of the frame, the frame including one or more gas flame burners controlled along the front side and supported by the frame;
    a griddle configured to be positioned above the upper edge of the frame and positioned above the one or more gas flame burners, the griddle having a splash guard extending upward from a cooking surface of the griddle to a top edge of the splash guard, the splash guard extending to define a first side splash guard, a second side splash guard, a front side splash guard and a rear side splash guard, the first side splash guard extending parallel with the second side splash guard, and the front side splash guard extending parallel with the rear side splash guard;

a hood sized and configured to be positioned over the griddle in a covered position, the hood having a top side hood panel, a first side hood panel, a second side hood panel, and a front side hood panel, upon the hood being in the covered position, each of the first and second side hood panels extending transverse relative to the top side hood panel, the front side hood panel extending transverse relative to the top side hood panel, the hood positionable over the griddle in the covered position so that the first side hood panel extends downward from the top side hood panel and spaced relative to the first side splash guard to define a first side space therebetween and the second side hood panel extends downward from the top side hood panel and spaced relative to the second side splash guard to define a second side space therebetween; and a first duct unit and a second duct unit each including one or more duct panels sized and configured to channel heat from an underside of the griddle, wherein, upon the hood being in the covered position, the first duct unit is positioned between the first side hood panel and the first side splash guard so as to be positioned within the first side space such that the first duct unit extends upward from adjacently below the griddle, above the upper edge of the frame, and adjacent to the top edge of the first side splash guard, and the second duct unit is positioned between the second side hood panel and the second side splash guard to be positioned within the second side space such that the second duct unit extends upward from adjacently below the griddle, above the upper edge of the frame, and adjacent to the top edge of the second side splash guard, the first and second duct units being coupled to the respective first and second sides of the frame and are configured to funnel heat from the one or more gas flame burners under the griddle to a region above the griddle so that the one or more duct panels of each of the first and second duct units act to shield and minimize heating of the first and second side hood panels of the hood, respectively, with the hood in the covered position.

6. The outdoor cooking station of claim 5, wherein, upon the hood being in the covered position, the hood is positioned over the griddle and the first and second duct units.

7. The outdoor cooking station of claim 5, wherein, upon the hood being moved to the covered position, the first and second duct units are configured to direct heat upward to above the griddle and under the hood.

8. The outdoor cooking station of claim 5, wherein the hood is pivotably coupled to the rear side of the frame such that the hood, upon being in the covered position, is positioned over the first and second duct units and the griddle.

9. The outdoor cooking station of claim 5, further comprising at least one of a first side shelf and a second side shelf, the at least one of the first and second side shelves positioned along the first and second sides, respectively, of the frame.

10. The outdoor cooking station of claim 9, wherein the first and second duct units are configured to direct heat upward so as to substantially prevent heat from moving laterally over the at least one of the first and second side shelves.

11. The outdoor cooking station of claim 5, wherein the frame comprises panels coupled thereto to define a cabinet structure below the one or more gas flame burners.

12. The outdoor cooking station of claim 5, wherein the first and second duct units define upward extending walls and a top side wall, the upward extending walls each extending to define an open-ended bottom side and the top side wall defining vents therein, the top side wall extending at a level above the cooking surface of the griddle.

13. A method for channeling heat in an outdoor cooking station, the method comprising:

providing a frame extending to define a front side, a rear side, a first side and a second side each extending between a lower end and an upper edge of the frame of the outdoor cooking station, the frame including one or more gas flame burners supported by the frame, the frame having a hood pivotably coupled adjacent to the rear side of the frame such that the hood is moveable between a closed position and an open position, the frame configured to support a griddle with a splash guard such that the griddle is positioned above the one or more gas flame burners and above the upper edge of the frame, the splash guard of the griddle extending from the cooking surface to a top edge of the splash guard, the frame including a first duct unit and a second duct unit coupled to the first side and the second side of the frame, respectively, the first and second duct units each including one or more duct panels extending adjacently along corresponding opposing sides of the griddle such that, upon the hood being in the closed position, the first duct unit is positioned between a first sidehood panel of the hood and a first side splash guard of the splash guard of the griddle so as to extend upward from adjacently below the griddle, above the upper edge of the frame, and adjacent to the top edge of the first side splash guard, and the second duct unit is positioned between a second side hood panel of the hood and a second side splash guard of the splash guard of the griddle so as to extend upward from adjacently below the griddle, above the upper edge of the frame, and adjacent to the top edge of the second side of the splash guard; positioning the hood in the closed position; and channeling heat from the one or more gas flame burners from below the griddle and through the first and second duct units to a region above the griddle and under the hood to minimize heating the first side hood panel and the second side hood panel of the hood with the one or more duct panels of the respective first and second duct units shielding the heat therefrom.

14. The method according to claim 13, wherein the positioning comprises pivotably moving the hood to the closed position so that the hood covers the griddle and the first and second duct units.

15. The method according to claim 13, wherein the positioning comprises positioning the hood over the griddle to cover the splash guard extending directly upward from a cooking surface of the griddle, the splash guard extending along an entire periphery of the griddle.

16. The method according to claim 13, wherein the providing comprises providing the frame with at least one of a first side shelf and a second side shelf coupled to respective first and second sides of the frame.

17. The method according to claim 16, further comprising positioning the hood in the open position such that heat is channeled to above the griddle to minimize heat moving over the at least one of the first side shelf and the second side shelf.

* * * * *